(12) United States Patent
Pyhrr et al.

(10) Patent No.: US 8,485,447 B1
(45) Date of Patent: Jul. 16, 2013

(54) THIN GAGE OPEN LOOP SYSTEM CARDS AND METHOD OF MANUFACTURE

(75) Inventors: Peter A. Pyhrr, Cedar Hill, TX (US); Michael J. Hale, Nashville, TN (US)

(73) Assignee: PAP Investments, Ltd., Dallas, TX (US)

( * ) Notice: Subject to any disclaimer, the term of this patent is extended or adjusted under 35 U.S.C. 154(b) by 183 days.

(21) Appl. No.: 13/017,650

(22) Filed: Jan. 31, 2011

Related U.S. Application Data

(60) Provisional application No. 61/417,002, filed on Nov. 24, 2010.

(51) Int. Cl.
*G06K 19/06* (2006.01)

(52) U.S. Cl.
USPC .......................................... 235/492; 235/488

(58) Field of Classification Search
USPC .................. 235/492, 488, 375, 493, 491, 486, 235/487
See application file for complete search history.

(56) References Cited

U.S. PATENT DOCUMENTS

| | | | |
|---|---|---|---|
| 3,790,754 A | 2/1974 | Black et al. | |
| 4,573,711 A | 3/1986 | Hyde | |
| 4,938,830 A * | 7/1990 | Cannistra | 156/270 |
| 4,973,515 A | 11/1990 | Otonari et al. | |
| 5,177,344 A | 1/1993 | Pease | |
| 6,152,029 A * | 11/2000 | Templeton | 101/35 |
| 6,173,901 B1 * | 1/2001 | McCannel | 235/493 |
| 6,471,128 B1 * | 10/2002 | Corcoran et al. | 235/488 |
| 6,592,035 B2 | 7/2003 | Mandile | |
| 6,644,551 B2 | 11/2003 | Clayman et al. | |
| 6,817,530 B2 | 11/2004 | Labrec et al. | |
| 7,000,844 B1 * | 2/2006 | Smith | 235/487 |
| 7,090,935 B2 * | 8/2006 | Azakami et al. | 428/834 |
| 7,341,198 B2 | 3/2008 | Nishizawa et al. | |
| 2002/0180206 A1 | 12/2002 | Tronrud | |
| 2004/0004131 A1 | 1/2004 | Emmert | |
| 2005/0263253 A1 * | 12/2005 | Steuer | 156/553 |
| 2006/0080198 A1 | 4/2006 | Doyle | |
| 2007/0125866 A1 | 6/2007 | Nishizawa et al. | |
| 2007/0175984 A1 | 8/2007 | Khandaker et al. | |
| 2009/0019751 A1 | 1/2009 | Goetting | |
| 2009/0065138 A1 * | 3/2009 | Engel et al. | 156/273.3 |
| 2011/0215155 A1 * | 9/2011 | Bonneau et al. | 235/487 |

FOREIGN PATENT DOCUMENTS

JP 9011673 1/1997

* cited by examiner

*Primary Examiner* — Thien M Le
(74) *Attorney, Agent, or Firm* — Garvey, Smith, Nehrbass & North, L.L.C.; Gregory C. Smith; Julia M. FitzPatrick

(57) ABSTRACT

An improved card design and manufacturing method to produce thin gage, open loop system cards, such as credit cards, debit cards, prepaid cards, financial cards, and payroll cards. The thin gage card structure may vary between 5-15 mils in thickness (0.005" inches to 0.015" inches) on a one ply plastic material such as PVC or polyester. The majority of manufacturing steps can be performed on a rotary press in a single operation. Card personalization will be accomplished on a high-speed machine using ink jet for all variable information imaged on both the front and back, and accompanied by high speed encoding of magnetic stripe or activation of integrated circuit elements utilized in the electronic payment process.

4 Claims, 4 Drawing Sheets

THIN GAGE OPEN LOOP SYSTEM CARDS AND METHOD OF MANUFACTURE

CROSS-REFERENCE TO RELATED APPLICATIONS

Priority of U.S. Provisional Patent Application Ser. No. 61/417,002, filed Nov. 24, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to credit cards, debit cards, prepaid cards, financial cards, reward cards, payroll cards, and other cards used in an "open loop" system. An open loop card has the unique characteristics in that it can be used anywhere that an electronic payment network is used (Visa, MasterCard, American Express, Discover, etc). The account value is normally not physically stored on the card; instead, the card number uniquely identifies a record in a central database, where the account balance is maintained; therefore, the card must contain a card number for central database identification. Cards may contain a users name (such as a credit card), or may not contain a name (such as a prepaid or open loop gift card) and therefore be anonymous as to user identification.

For the purpose of this invention, the term "credit card" will be used for all "open loop" system cards.

2. General Background

The following U.S. Patents are incorporated herein by reference:

TABLE

| PAT. NO. | TITLE | ISSUE DATE |
| --- | --- | --- |
| 3,790,754 | Security Access Medium | Feb. 5, 1974 |
| 4,573,711 | Secure Credit Card and Method of Manufacturing Same | Mar. 4, 1986 |
| 4,973,515 | Magnetic Card | Nov. 27, 1990 |
| 6,592,035 | Method and Apparatus for Rapid, Serial Transaction Item Fabrication | Jul. 15, 2003 |
| 6,644,551 | Card | Nov. 11, 2003 |
| 6,817,530 | Multiple Image Security Features for Identification Documents and Methods of Making Same | Nov. 16, 2004 |
| 7,341,198 | IC Card and a Method of Manufacturing Same | Mar. 11, 2008 |
| 2004/0004131 | High Temperature Tag Having Enclosed Transceiver | Jan. 8, 2004 |
| 2006/0080198 | Cash Transaction System | Apr. 13, 2006 |
| 2007/0125866 | IC Card and a Method of Manufacturing Same | Jun. 7, 2007 |
| 2009/0019751 | Removably Attachable Card and Card Retaining Device | Jan. 22, 2009 |

In contrast to the open loop concept, a "closed loop" system restricts card usage to a single merchant or merchant group (restaurant, retail store, etc). The card typically contains a card number for point-of-sale activation and card inventory control. A central database is used for point-of-sale activation, processing of subsequent card based transactions, and maintenance of the associated account value. The card user is usually not identified.

In today's gift card market, both open loop and closed loop gift cards are common. The gift card market started primarily as a closed loop system, but open loop cards are evolving as a preferred choice since the gift recipient can use the card at an unlimited number of merchants.

Credit cards were introduced in the mid 1960's, and by 1977 Visa became the first credit card to be recognized worldwide and have the following features:

Physical Attributes
    a. 30 mil multilayer PVC
    b. Account #
    c. Signature Panel
    d. Magnetic Stripe
2. Account charges recorded using a specialized credit card imprinter
    a. Used embossed credit card to get customer information (Name, Account No., Expiration Date, etc.)
    b. Embossed metal merchant plate set in imprinter
    c. Adjustable data wheels to give date and transaction amount
    d. Multi-part form set to obtain physical copies (customer, merchant, credit card company)
    e. Roller carriage mechanically pulled over the form set (imprinting data/transaction amount, merchant information and credit card information
3. 30 mil card construction
    a. Necessitated by credit card imprinter
    b. Mechanical pressure of rollers going over card flatten embossing on thinner cards
4. 30 mil construction legacy
    a. Brand image, bulk (thickness and raised lettering) creates perceived customer value (vs. non-embossed or thin card)
    b. No longer required since card transactions are processed electronically using the magnetic stripe or embedded microchip.
    c. Electronic verification of most cards, especially those for debit and prepaid accounts.
    d. Print transaction receipt on separate inexpensive printer Disadvantages of 30 Mil Credit Cards Versus a Thin Gage (5-15 Mil) Credit Card
1. Thickness/Bulk: Thicker wallet and packages.
    a. 30 mil card—no embossing (variable information printed using thermal transfer ribbon or inkjet)
        i. 10 mil (3 times thicker)
        ii. 7 mil (4.3 times thicker)
    b. 30 mil card with embossing: 50 mil thickness
        1. 10 mil: 5 times thicker
        2. 7 mil: 7 times thicker. Thicker wallet and packages.
2. Weight
    a. Added mailing costs
    b. Heavier wallet/purse
3. Embossing
    a. Increases caliper 65-100%
    b. Shortens card life by compromising material integrity during embossing process where stock is mechanically stretched to create the relief of the embossed characters.
4. Increased cost per card
    a. Multiple ply lamination versus single ply
    b. More material by weight
    c. Increased number of manufacturing steps d. Requires a multiple step sheet printing and laminating process versus thin gage cards printed and die cut on a rotary press process (rotary presses typically cannot print material over 15 mils thick as thicker material is too stiff to go around rollers on a rotary press versus a relatively straight path on a sheet fed press).

Disadvantages of Thin Gage Cards
1. Customer perception that thinner card is less valuable
   a. Brand Image: Embossing and thicker card is more valuable than a flat thin card.
   b. Perception starting to change as thin gage cards become more common and customers realize the user advantages of the thinner card.
2. Some older swipe readers may not read a thin card unless the magnetic stripe read head is spring mounted to accommodate variations in card thickness.
   a. Most modern swipe terminal readers have spring mounted magnetic read heads that can read 5-30 mil cards
3. Not all personalization features are available on thinner cards. Embossing and indented CVV2 on back of card is not practical on a thin gage card because these features physically require a thicker card.
4. RFID/Memory Chip Cards require a multiple layer laminated card (to insert the RFID chip and antenna, or the memory chip)

III. Background: Manufacturing Process—Standard Credit Card (30 mil)
1. PVC overlay with magnetic stripe
   a. Magnetic stripe is hot stamped in one PVC overlay (back side)
   b. Separate operation on a tape-layer machine in roll to sheet or sheet to sheet configuration
   c. Magnetic liquid slurry is placed on a Mylar carrier (and dried in a manner similar to ink) that creates a magnetic tape that is put into a roll and slit to the width of the magnetic stripe. The roll of magnetic tape is applied with heat (leaving the magnetic slurry stripe) and the Mylar carrier is removed. In the proposed process, magnetics are directly applied to the thin gage, one-layer plastic card; no Mylar carrier is required, thus eliminating one cost and manufacturing element.
2. PVC Core Printing: The PVC is printed on both the front and backside using a variety of sheet fed presses (frequently including litho press and silk screen process).
3. Collation: The three sheets (front side PVC overlay, PVC core element, and back side PVC overlay with magnetic stripe) are collated together and ultrasonically welded at several points on the sheets to maintain registration.
4. Laminator: The three collated sheets are placed between metal lamination plates (called a "book"), and several books are placed in a laminator. Heat and pressure are applied to do a controlled melt of products bonding the core and top and bottom overlays into a single piece. After the sheets have cooled, they are removed from the laminator plates and stacked for die cutting.
5. Die Cutting the Individual Cards: Laminated sheets (30 mil) are placed in a die cutter or card punch to produce individual cards.
6. Apply hologram and signature panel to individual cards. The hologram is either applied to the front or back of each card by hot stamp, and the signature panel is applied to the back of the card by hot stamp. This application may be done in one combined operation, or two separate operations. The non-personalized card body is complete.

IV. Card Personalization
Card personalization may include the following elements:
1. Card Number (embossed, or printed by thermal transfer or ink jet)
2. Validity Date/Expiration Date (embossed or printed by thermal transfer or ink jet)
3. Individual's Name (embossed or printed by thermal transfer or ink jet).
4. CVV2 on back side (indent printed or printed by thermal transfer or ink jet). (CVV2 Definition is the trade term for "Card Verification Value 2" which is a secondary security related to the card number.
   For the traditional 30-mil card, the CVV2 must be imprinted on the back of the card, and must be indent printed. Indent printing is the process of pressing printed characters downward into the surface of the card.) On the thin gage card, the CVV2 can be thermal printed or ink jet printed on the surface of the card, but the printing is not indented.
5. Other printing: PIN number with scratch off label; package reference number, etc.
6. Magnetic encoding Personalization elements are identical on both the standard 30-mil card as the thin gage card. However, on the thin gage card, there is no embossing or indented CVV2. The thin gage card is serialized using thermal transfer printing or ink jet printing.

SUMMARY OF THE PRESENT INVENTION

The present invention is the result of the discovery of an improved card design and manufacturing method to produce thin gage, open loop system cards, such as credit cards, debit cards, prepaid cards, financial cards, and payroll cards. The thin gage card structure may vary between 5-15 mils in thickness (0.005" inches to 0.015" inches) on a one ply plastic material such as PVC, polycarbonate, styrene, polyester, PLA, or comparable natural or synthetic material. The majority of manufacturing steps can be performed on a rotary press in a single operation. Personalization will be accomplished in one step on a high-speed machine using ink jet for all information on both the front and back plus magnetic encoding.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1A:
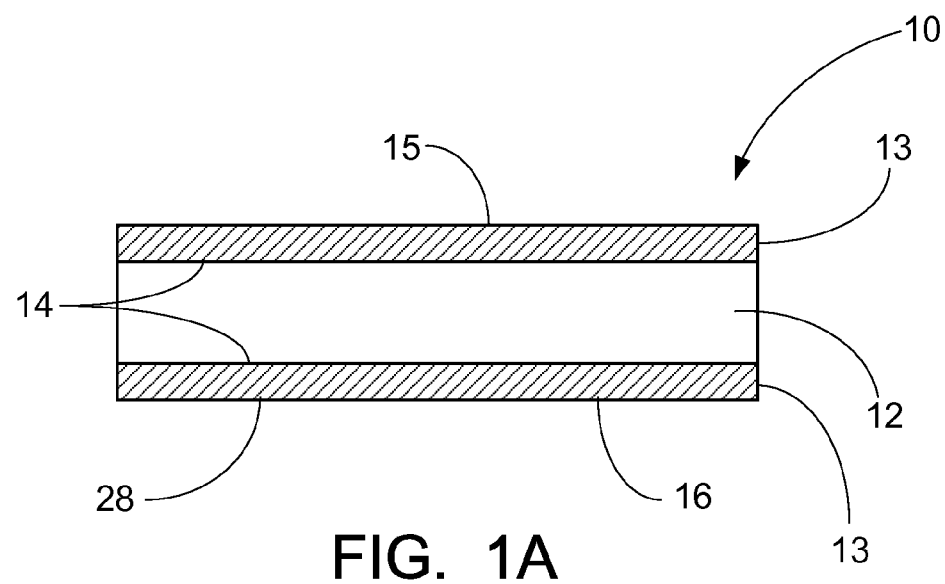
FIGS. 1A and 1B illustrate cross-section views of a prior art single core and a double core card respectively.
Figure 1B:
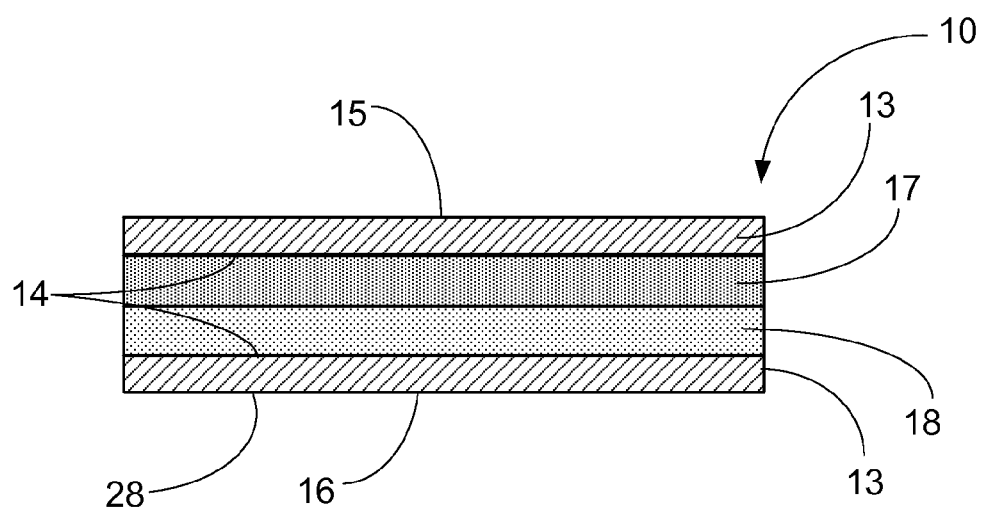
Figure 2:
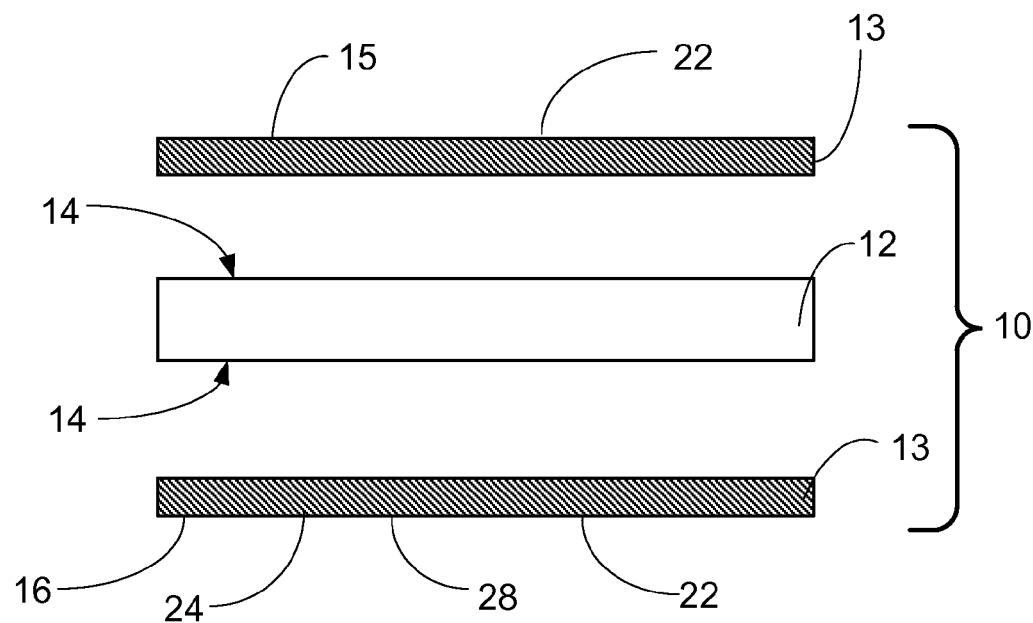
FIG. 2 illustrates an exploded cross-section view of a prior art single core card.
Figure 3:
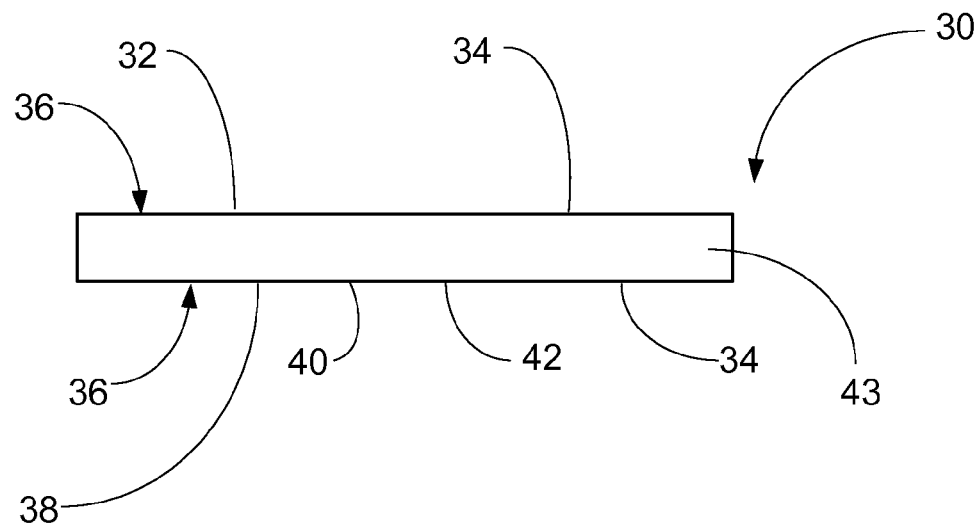
FIG. 3 illustrates a cross-section view of a thin gage open loop card of the present invention.
Figure 4:
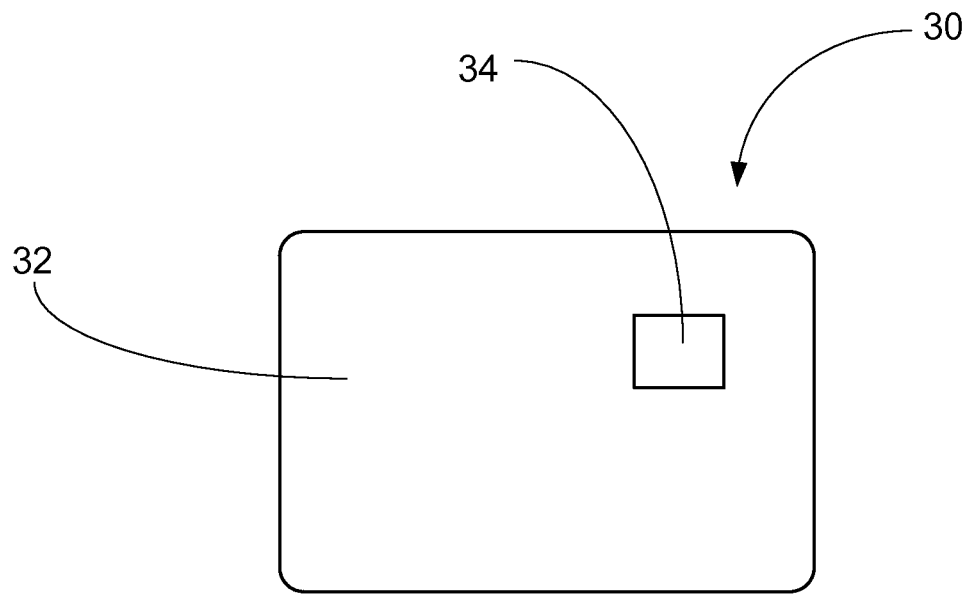
FIG. 4 illustrates a front view of the card illustrated in FIG. 3.
Figure 5:
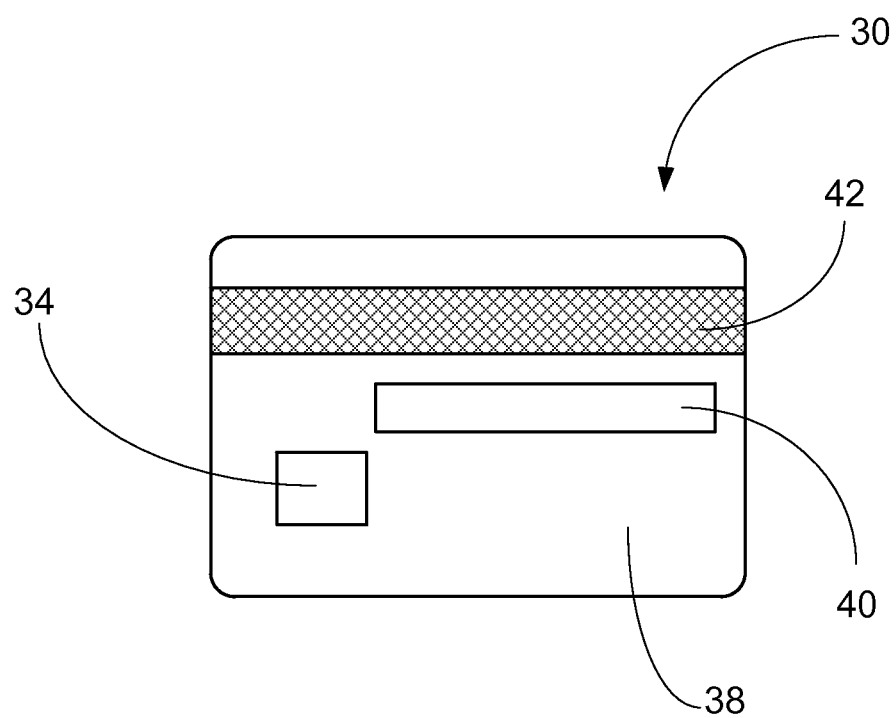
FIG. 5 illustrates a back side view of the card illustrated in FIG. 3.

Before a discussion of the present invention, as illustrated in FIGS. 3 through 6C, reference is made to FIGS. 1A through 2, which illustrate the prior art cards as discussed above under the Background of the Invention.

In FIG. 1A there is a cross-section view of a standard credit card structure 10 having a PVC core element 12, a PVC overlay 13, with printed graphics 14, on both the front side 15 of the card 10, and the back side 16 of card 10. Back side 16 also includes a magnetic stripe 28. FIG. 1B illustrates the card structure 10, having two core elements assembled into a single card, called a split core card, where there are provided the two PVC core elements 17 and 18 between the upper and lower PVC overlays 13, which defines a split core card 10 having a thickness of 30 mils. The card would have the same features as the single core card 10 in FIG. 1A, and both cards would be fabricated in the manner as discussed under the General Background as discussed earlier.

The prior art card 10 is also illustrated in FIG. 2, where there is provided the upper and lower PVC overlays 13, with a single core element 12 therebetween, and including a hologram 22 on the front face 15 of the card, (or a hologram 22 on the back side of the card 16); and a signature panel 24 and magnetic strip 28 on the backside 16 of the card. Again the cards in FIGS. 1A, 18, and 2 are standard multilayered cards as discussed.

Turning now to the present invention as seen in FIGS. 3 through 6C, the improved card structure 30 defines the open loop card structure of the present invention. As seen first in side view in FIG. 3, card 30 has a front side 32 upon which a hologram 34 is provided, and includes printed graphics 36. The back side 38 of card 30 may include one or more of the following: a signature panel 40, a magnetic stripe 42 and a hologram 34. Card 30 utilizes a thin gage 5-15 mil (7 mil and 10 mil most common) of one ply material 43 which eliminates embossing and indented CVV2 and uses high speed ink jet for personalization. The process for fabricating the card 30 encompasses a more efficient manufacturing process. The magnetic stripe 42 is applied to thin gage material by the preferred method of first, applying a magnetic slurry stripe in multiple streams directly to the plastic. This manufacturing process is faster than applying hot stamped magnetics. Slurry magnetic materials are less expensive because the magnetic stripe coating is applied directly to the plastic rather than to a throw away Mylar carrier that is discarded after the transfer of the magnetic stripe coating to the plastic through the hot stamp magnetic tape application process.

An alternative would be to apply the hot stamped magnetic tape rather than applying magnetic slurry directly to the plastic. Another alternative would be to directly apply magnetic slurry or hot stamped magnetic tape during the rotary press operation.

In the rotary press operation one would print front sides 32 and back sides 38 of cards 30; next apply a hologram 34. As an alternative, one could apply a hologram 34 to single cards 30 after die cutting.

Next the signature panel 40 would be printed on the back 38 of card 30 using specialty inks. An alternative would be to apply the signature panel 40 using a heat transfer signature panel tape on press; or apply the signature panel 40 to single card 30 after die cutting in a separate operation in a one-step heat transfer operation with the hologram 34.

Next the cards 30 would be scored at line 45 for providing multi-part snap apart cards 30A and 30B. They would be die-cut into single cards 30. To effect the card personalization step would require only one pass high-speed operation using ink jet on both sides 32 and 38 for all variable information, and magnetic encoding. This process is more efficient since personalization equipment for traditional 30 mil cards with embossing or thermal transfer printing, operates at production rates of 400-2,500 cards per hour, while card personalization equipment using ink-jet, can operate at production rates of over 10,000 cards per hour.

Figure 6A:
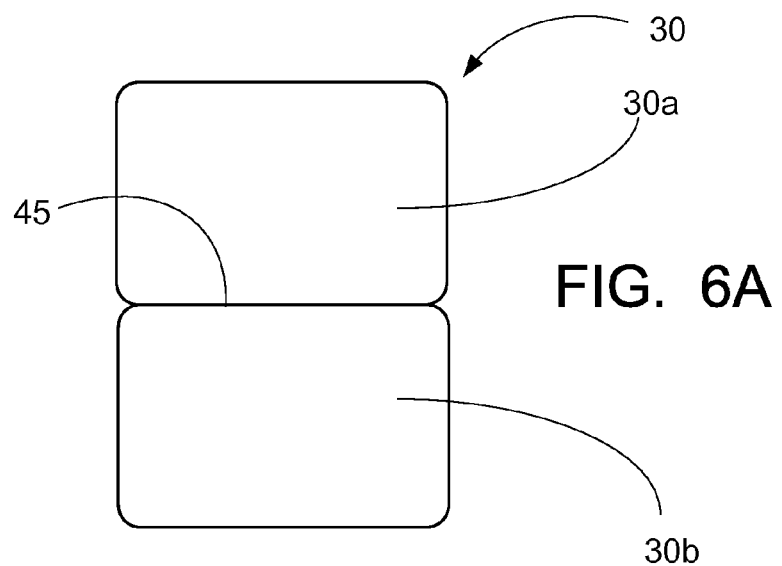
FIGS. 6A and 6B illustrate views of two multi-part snap apart cards of the present invention.
Figure 6B:
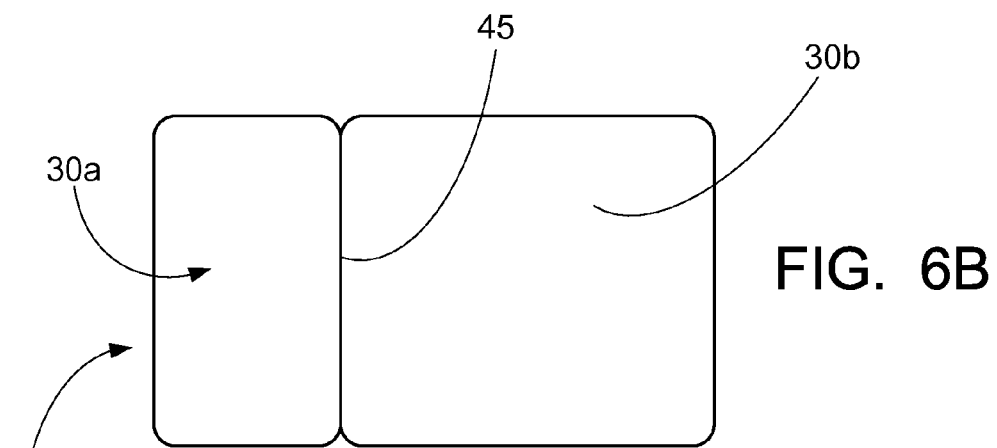
Figure 6C:
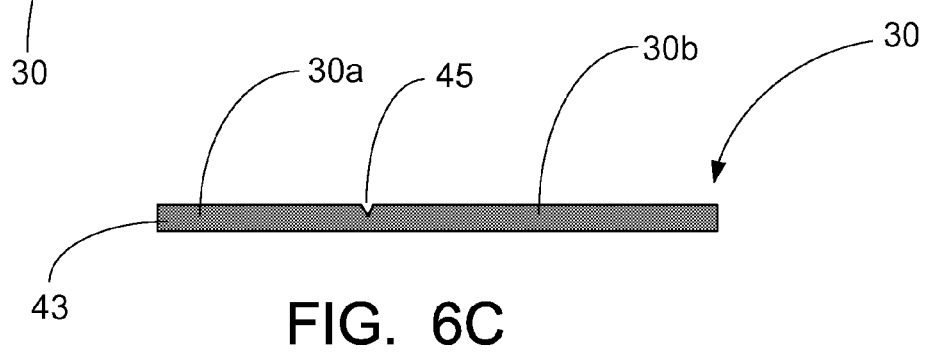
FIG. 6C illustrates a cross section view of the cards illustrated in FIGS. 6A and 6B, showing the snap apart feature of the cards.

FIG. 6A illustrates multi-part cards 30, having a score line 45 along their common edge, so that one card 30A would be the card to utilize, while the second card 30B may include advertising materials, instructions, and other information. FIG. 6B illustrates an additional embodiment of the multipart cards 30 as seen in FIG. 6A where the two cards 30A and 30B would snap apart along score line 45, and would define the card 30A used to carry out the transaction, and the card 30B for other information and instructions or advertising. FIG. 60 illustrates a side view of the multipart cards 30 shown in FIGS. 6A and 6B, and clearly shows the score line 45 which would allow the two cards 30A and 30B to be snapped apart when ready for use.

| PARTS LIST | |
|---|---|
| Description | Number |
| Standard card structure | 10 |
| PVC core element | 12 |
| PVC overlay | 13 |
| Printed graphics | 14 |
| Front side of card | 15 |
| Back side of card | 16 |
| PVC core element | 17 |
| PVC core element | 18 |
| Hologram | 22 |
| Signature panel | 24 |
| Magnetic stripe | 28 |
| Open loop card structure | 30 |
| Cards | 30A, 30B |
| Front side of card | 32 |
| Hologram | 34 |
| Printed graphics | 36 |
| Back side of card | 38 |
| Signature panel | 40 |
| Magnetic stripe | 42 |
| Single ply material | 43 |
| Score line | 45 |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A process for manufacturing a thin gage open loop system card, comprising the following steps:
   a) providing a thin gage one ply plastic type material, not to exceed 15 mil thickness, having front and back sides;
   b) applying a magnetic stripe, when a magnetic stripe is required, to the back side of the thin gage material by applying a magnetic stripe directly to the thin gage one ply plastic type material;

c) utilizing a rotary press operation to print the front and back sides of cards and apply a hologram thereto;

d) printing a signature panel, when a signature panel is required, onto the back side of the card using specialty inks;

e) personalizing the card by using high-speed ink jet application on the front and back sides to provide variable information and magnetic encoding, wherein the high-speed ink jet application allows for personalizing the card in only one pass.

2. The process in claim 1, wherein there are multi-part snap apart cards, scored along a common edge, to be disengaged from one another so that one card may be used to carry out a transaction and a second card be used for informational and advertising purposes.

3. A process for manufacturing a thin gage open loop system multi-part snap apart cards, comprising the following steps:

a) providing a first card with a thin gage one ply plastic material, not to exceed 15 mil thickness, having front and back sides;

b) applying a magnetic stripe to the back side of the first card of thin gage material by applying a magnetic stripe directly to the thin gage one ply plastic material;

c) utilizing a rotary press operation to print the front and back sides of the first card and applying a hologram thereto;

d) printing a signature panel, when a signature panel is required, onto the back side of the first card using specialty inks or hot stamp transfer;

e) personalizing the first card by using a one pass, high-speed ink jet application on the front and back sides to provide variable information and magnetic encoding; and f) scoring along a common edge of the first card and a second card, so that the cards can be disengaged from one another and the first card used to carry out a transaction and the second card used for informational and advertising purposes.

4. A process for manufacturing a thin gage open loop system card, of the type comprising a rectangular card body, further comprising a thin gage one ply plastic material between 5 and 15 mil thickness; a front side of the card having at least graphics printed thereupon; and a back side of the card, which may include a signature panel and either a magnetic stripe or integrated circuit for reading the cards contents; the process comprising the following steps:

a) providing the thin gage one ply plastic material, not to exceed 15 mil thickness, having front and back sides;

b) applying a magnetic stripe to a back side of the thin gage material by applying a magnetic stripe directly to the thin gage one ply plastic material;

c) utilizing a rotary press operation to print a front side and the back side of cards and apply a hologram thereto;

d) printing the signature panel, as required, onto the back side of the card using specialty inks or hot stamp transfer;

e) personalizing the card by using high-speed ink jet application on the front and back sides to provide variable information and magnetic encoding, wherein the high-speed ink jet application allows for personalization in only one pass.

* * * * *